L. SCHNEIDER & E. E. J. DUQUETTE.
VALVE.
APPLICATION FILED MAR. 1, 1917.
1,261,301.
Patented Apr. 2, 1918.
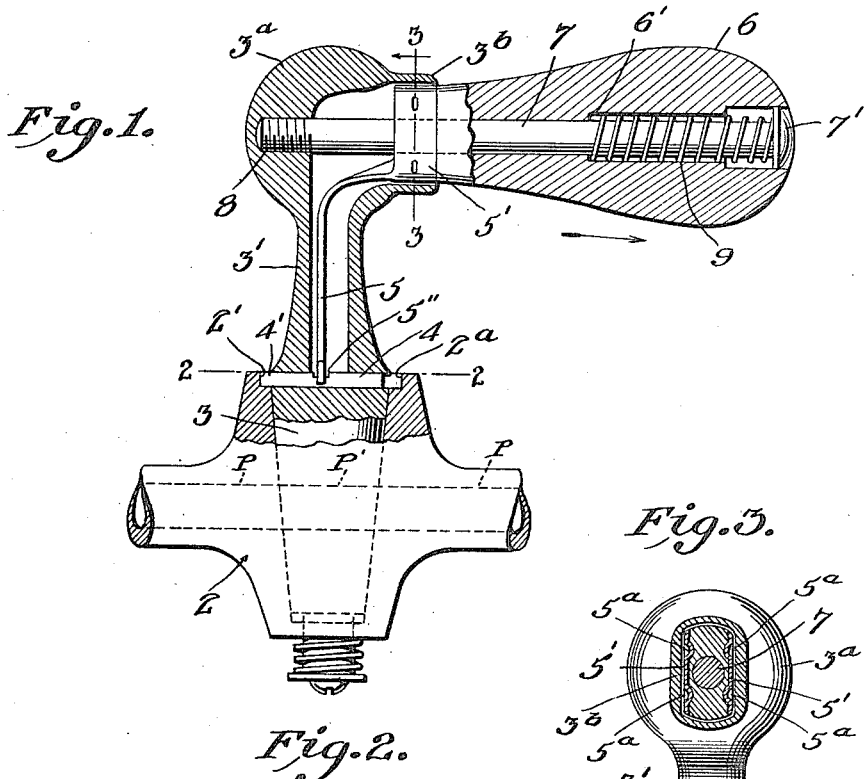
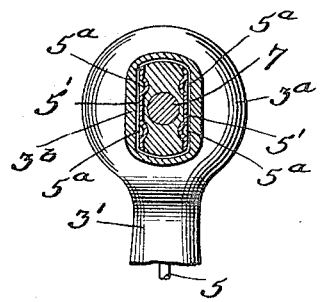
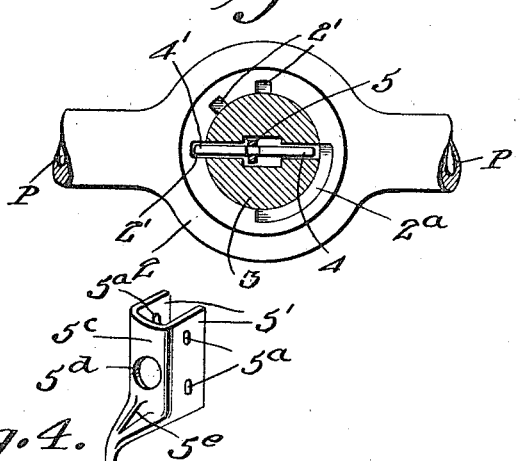
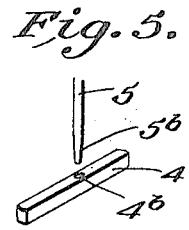
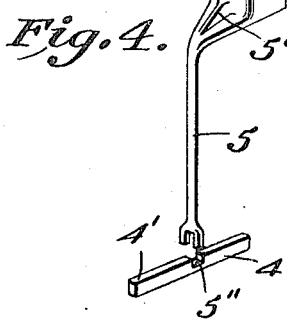
Inventor
E. E. J. Duquette
AND Louis Schneider
By
Attorneys

UNITED STATES PATENT OFFICE.

LOUIS SCHNEIDER, OF BOSTON, MASSACHUSETTS, AND EDWARD E. J. DUQUETTE, OF CENTRAL FALLS, RHODE ISLAND.

VALVE.

1,261,301.   Specification of Letters Patent.   Patented Apr. 2, 1918.

Application filed March 1, 1917. Serial No. 151,818.

*To all whom it may concern:*

Be it known that we, LOUIS SCHNEIDER and EDWARD E. J. DUQUETTE, citizens of the United States, residing at Boston, in the county of Suffolk and State of Massachusetts, and Central Falls, in the county of Providence and State of Rhode Island, respectively, have invented certain new and useful Improvements in Valves; and we do hereby declare the following to be a full, clear, and exact description of the invention, such as will enable others skilled in the art to which it appertains to make and use the same.

This invention relates to valves, and more particularly to a locking device applicable to valves of various types and designs and particularly to rotary cocks or bibs.

It is an object of the present invention to provide a simple, practicable and inexpensively constructed valve structure involving an automatic locking feature in which there is provided a bolt operable by a yieldably mounted handle so that a pull upon the handle with relation to the turnable member of the valve or cock will operate to disengage a locking bolt, in a movement in a direction with the lever, from one to another of locking seats complementary to the bolt and formed upon a portion of the valve casing.

With the above objects in view the present invention consists in a lock for securing relatively movable body and plug members together and comprising a handle or lever yieldingly mounted upon one of said members, as for instance the valve plug, and which handle is provided with a rigid connection extending through the plug and engaging a bolt movably carried by the plug so that the latter may be disengaged from locking position to permit the change of position of the plug of the valve as may be desired to control the flow of fluid through the valve or bib.

One embodiment of our invention is described in the following specification and illustrated in the drawing, in which:

Figure 1 is a partial side elevation and partial sectional view in the central plane of the valve plug, and its handle showing the invention as applied.

Fig. 2 is a plan view of the valve structure with the valve plug stem being shown in section on line 2—2 of Fig. 1.

Fig. 3 is a cross section on line 3—3 of Fig. 1 through the ferrule showing the attachment thereto to the inner end of the handle or lever of the valve.

Fig. 4 is a detail perspective view of the arm carried by the handle.

Fig. 5 is a detail of the bolt and a fragment of the engaging end of the arm of a modified form of the invention.

Our present invention is designed particularly with the object in view of simplifying the construction of a self-locking valve, and also with the object of rendering the operation of the valve more reliable and effective, and a particular object of the invention is to so construct the valve and design the parts thereof that a material reduction in the cost of manufacture of the parts is secured. To this end the present embodiment of the invention is disclosed as including a suitable form of casing 2, it being understood that the present embodiment of the invention is applied to a bib or cock and that it is not so limited but may be utilized in combination with various other members which are to be locked in one or another of their relative positions. Fitted turnably within the casing 2 there is a plug 3, these members being provided with the usual ports $p$ and $p'$ to control flow of fluid therethrough, and the plug 3 is here shown as having a tubular or hollow stem $3'$ and at its upper end a head $3^a$ formed at one side with a socket $3^b$. Transversely movable and guided in the upper portion of the plug 3 there is provided a simple and suitable form of bolt 4, one end of which, as $4'$, is adapted to be automatically projected into locking engagement with one or another of a series of bolt seats or notches $2'$ formed in the casing 2 or in a member mounted thereon, the position of these notches $2'$ being so disposed that the plug 3 may be locked in any of its relative positions as to the casing 2 to control the quantity of flow of fluid through the valve. In some instances the bolt 4 may project transversely from opposite sides of the valve plug 3; and in such case the side of the casing 2 diametrically opposite the bolt seats $2'$ would be provided with an arcuate slot $2^a$ of sufficient length to permit the projecting end of the bolt 4 when withdrawn from the seats $2'$ to swing freely through the necessary degree of movement until the locking end of the bolt $4'$ is brought into alinement with the respective seat 2' in coincidence with the position at which it is desired to lock the valve plug.

One of the important features of our present invention is to provide a simple, practicable, effective and inexpensive means for disengaging the locking bolt 4 from its selected seat 2', and in this embodiment of our invention this means consists of an arm, bar, rod or other suitable element 5, the lower end of which engages or interlocks with the bolt 4 by any suitable form of joint, as at 5', so that when the arm 5 is shifted transversely of the stem 3', the bolt 4 is simultaneously shifted and is caused to disengage an engaged seat 2' when a handle or lever 6 is pulled in the direction of the arrow. To secure this coöperation of the bolt 4 and its engaging arm 5 the upper end of the arm is shown as rigidly secured to the inner end of the handle 6, and in any suitable manner. Preferably this connection is obtained by attaching to or forming upon the upper end of the arm 5 a pair of plates 5' adapted to overlap the inner end of the handle 6, these plates being secured thereon in an inexpensive manner by inwardly punching or burring the sides thereof as at 5' so as to bite into the end of the handle 6 which may be made of wood or other suitable material.

In order to render the locking operation of the valve automatic the handle 6 is shown as formed hollow and as slidably mounted upon a rod or elongated screw 7 having its inner end screwed into a threaded portion 8 at the head 3$^a$ of the valve plug, the outer end of the screw 7 having a head or shoulder 7' against which there reacts an expansile spring 9 which is fitted within the outer chambered end of the handle 6 and abuts at its opposite end in a shoulder 6' in the handle.

In operation the normal tendency of the spring 9 in expanding is to act outwardly against the head 7' of the screw 7 and force the handle 6 inwardly so that the ferrule-like portion 5' on the upper end of the arm 5 is guided through and shifted inwardly in the socket or bearing portion 3$^b$ of the head 3$^a$ of the valve plug. In this innermost position of the handle 6, the bar or arm 5 acts upon the bolt 4 to force it into locking engagement with one of the seats 2' of the valve casing, and thus securely hold the plug in its desired position against accidental movement. When it is desired either to open or close the valve a person simply grasps the handle 6, and giving it a slight outward pull as indicated by the arrow, the arm 5 is drawn transversely across the hollow stem 3' of the valve plug and this operation simultaneously withdraws the bolt 4 from a locking seat 2' and thus frees the plug 3 so that upon a turning force being applied to the handle 6 the plug 3 may be turned to the desired position in the casing 2, and when the handle 6 is released the spring 9 automatically acts to shift it inwardly and thereby throw the bolt 4 into locking engagement with a co-incident locking seat 2'.

As above mentioned, we do not desire to be limited to any particular type of connection of the arm 5' to the handle 6, nor do we desire to be limited to any particular means for interlocking the lower end of the rod 5 with the bolt 4. For instance, a variation of the interlocking connection is shown in Fig. 5 in which the bolt 4 is provided with an aperture 4$^b$ to receive the end 5$^b$ of the shifting bar 5.

In that form of the connection shown in Fig. 4, the locking bar has integrally connected to it at its upper end the opposite cheeks or side plates 5', these being connected by a transverse portion 5$^a$ having a hole 5$^d$ through which slidably passes the inner end of the screw or support 7 upon which the handle 6 is slidably mounted. We prefer, for purposes of economy of manufacture and cheapness of assembly of the parts, to form the arm 5 of a stamping to which the ferrule forming plates 5' are integrally connected, and the arm may be reinforced at its connection to the ferrule portion by ribbing the connecting portion as at 5$^e$.

What is claimed as new is:

1. The combination with a pair of relatively movable members, of means for automatically locking the said members including a bolt slidably mounted transversely on one thereof and engageable with locking means on the other at different positions, a lever operatively mounted upon the member carrying the bolt and provided with a rigid arm for interlocking with and disengaging the bolt from the locking means by a movement of said bolt unidirectional with that of the lever and arm.

2. The combination with a pair of relatively movable members, of means for automatically locking the said members including a bolt transversely slidable on one thereof and engageable with locking means on the other at different positions, a lever operatively mounted upon the member carrying the bolt and provided with a rigid arm extending through said member for disengaging the bolt from the locking means.

3. The combination with a member having a series of bolt seats, and an element operatively mounted on said member, of a bolt slidably mounted on said element to engage said seats, and a lever operatively mounted on said element and having a rigid part interlocking with said bolt for disengaging it from said seats by a movement unidirectional with a movement of the lever.

4. A self-locking valve comprising a casing having a series of bolt seats, a plug movably fitting said casing and having a hollow stem, a bolt operable in the plug to engage the seats in the casing, and a handle yieldingly mounted on the plug and having a rigid arm extending therethrough to interlock with and operate said bolt.

5. A valve comprising a casing, provided with bolt seats, a plug having a hollow stem and carrying a movable bolt engageable with said seats, a hollow handle, a rod attached to the plug stem and upon which the handle is movably mounted, a spring interposed between said rod and the handle to move the latter toward the stem, and a ferrule attached to the inner end of the handle and fitting a socket in the plug end, and an arm connected to the ferrule, passing down in said stem and interlocked with said bolt, whereby the bolt is moved unidirectionally with the handle.

In testimony whereof we affix our signatures.

LOUIS SCHNEIDER.
EDWARD E. J. DUQUETTE.

Copies of this patent may be obtained for five cents each, by addressing the "Commissioner of Patents, Washington, D. C."